(12) United States Patent
Staudinger et al.

(10) Patent No.: US 12,061,256 B2
(45) Date of Patent: *Aug. 13, 2024

(54) METHODS AND SYSTEMS FOR ACOUSTIC MACHINE PERCEPTION FOR AN AIRCRAFT

(71) Applicant: The Boeing Company, Chicago, IL (US)

(72) Inventors: Tyler C. Staudinger, Huntsville, AL (US); Nick S. Evans, Lynnwood, WA (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/988,001

(22) Filed: Nov. 16, 2022

(65) Prior Publication Data

US 2023/0280462 A1    Sep. 7, 2023

Related U.S. Application Data

(63) Continuation of application No. 16/440,636, filed on Jun. 13, 2019, now Pat. No. 11,531,100.

(51) Int. Cl.
| | | |
|---|---|---|
| *G01S 13/00* | (2006.01) | |
| *G01M 15/14* | (2006.01) | |
| *G01S 13/86* | (2006.01) | |
| *G01S 13/934* | (2020.01) | |
| *G01S 17/10* | (2020.01) | |

(Continued)

(52) U.S. Cl.
CPC ............ *G01S 13/934* (2020.01); *G01M 15/14* (2013.01); *G01S 13/862* (2013.01); *G01S 13/867* (2013.01); *G01S 17/10* (2013.01); *G01S 17/894* (2020.01); *G01S 17/933* (2013.01); *G01S 19/14* (2013.01); *G01W 1/00* (2013.01)

(58) Field of Classification Search
USPC ......................................................... 367/128
See application file for complete search history.

(56) References Cited

U.S. PATENT DOCUMENTS

| | | |
|---|---|---|
| 8,059,489 B1 | 12/2011 | Lee et al. |
| 9,554,738 B1 | 1/2017 | Gulati et al. |

(Continued)

FOREIGN PATENT DOCUMENTS

WO    2019067695 A1    4/2019

*Primary Examiner* — James R Hulka
(74) *Attorney, Agent, or Firm* — McDonnell Boehnen Hulbert & Berghoff LLP

(57) ABSTRACT

In an example, a method is described. The method includes causing one or more sensors arranged on an aircraft to acquire, over a window of time, first data associated with a first object that is within an environment of the aircraft, where the one or more sensors include one or more of a light detection and ranging (LIDAR) sensor, a radar sensor, or a camera, causing an array of microphones arranged on the aircraft to acquire, over approximately the same window of time as the first data is acquired, first acoustic data associated with the first object, and training a machine learning model by using the first acoustic data as an input value to the machine learning model and by using an azimuth, a range, an elevation, and a type of the first object identified from the first data as ground truth output labels for the machine learning model.

20 Claims, 7 Drawing Sheets

(51) Int. Cl.
    *G01S 17/894*    (2020.01)
    *G01S 17/933*    (2020.01)
    *G01S 19/14*     (2010.01)
    *G01W 1/00*     (2006.01)

(56) References Cited

U.S. PATENT DOCUMENTS

| | | |
|---|---|---|
| 10,606,270 B2 | 3/2020 | Englard et al. |
| 10,643,368 B2 | 5/2020 | Yu et al. |
| 10,710,592 B2 * | 7/2020 | Lin ................. G01S 17/931 |
| 10,737,717 B2 | 8/2020 | Peng et al. |
| 11,155,258 B2 * | 10/2021 | Bush ............... B60W 60/00274 |
| 11,169,536 B2 | 11/2021 | Halder |
| 11,531,100 B2 * | 12/2022 | Staudinger ............ G01S 13/862 |
| 2018/0292830 A1 | 10/2018 | Kazemi et al. |
| 2018/0374253 A1 | 12/2018 | Yu et al. |
| 2019/0113919 A1 | 4/2019 | Englard et al. |
| 2019/0113927 A1 | 4/2019 | Englard et al. |
| 2019/0248411 A1 * | 8/2019 | Peng ................. G06N 3/084 |
| 2019/0310654 A1 | 10/2019 | Halder |

\* cited by examiner

DETECTING, BY THE PROCESSOR, OVER APPROXIMATELY THE SAME WINDOW OF TIME AS THE FIRST DATA AND THE FIRST ACOUSTIC DATA ARE ACQUIRED, AUTOMATIC DEPENDENT SURVEILLANCE-BROADCAST INFORMATION BROADCAST BY THE FIRST OBJECT,

WHEREIN THE AUTOMATIC DEPENDENT SURVEILLANCE-BROADCAST INFORMATION INDICATES AN AZIMUTH OF THE FIRST OBJECT RELATIVE TO THE EARTH, A RANGE OF THE FIRST OBJECT RELATIVE TO THE EARTH, AN ELEVATION OF THE FIRST OBJECT RELATIVE TO THE EARTH, THE TYPE OF THE FIRST OBJECT, A HEADING OF THE FIRST OBJECT, AND A SPEED OF THE FIRST OBJECT — 210

TRAINING THE MACHINE LEARNING MODEL BY USING THE AZIMUTH OF THE FIRST OBJECT RELATIVE TO THE EARTH, THE RANGE OF THE FIRST OBJECT RELATIVE TO THE EARTH, THE ELEVATION OF THE FIRST OBJECT RELATIVE TO THE EARTH, THE TYPE OF THE FIRST OBJECT, THE HEADING OF THE FIRST OBJECT, AND THE SPEED OF THE FIRST OBJECT INDICATED BY THE AUTOMATIC DEPENDENT SURVEILLANCE-BROADCAST INFORMATION BROADCAST BY THE FIRST OBJECT AS AT LEAST A PORTION OF THE GROUND TRUTH OUTPUT LABELS FOR THE MACHINE LEARNING MODEL — 212 — 206

FIG. 6

RECEIVING, BY THE PROCESSOR, OVER APPROXIMATELY THE SAME WINDOW OF TIME AS THE FIRST DATA AND THE FIRST ACOUSTIC DATA ARE ACQUIRED, INFORMATION INDICATING A STATE OF AN ENGINE OF THE AIRCRAFT — 214

TRAINING THE MACHINE LEARNING MODEL BY USING THE STATE OF THE ENGINE AS ONE OF THE GROUND TRUTH OUTPUT LABELS FOR THE MACHINE LEARNING MODEL,

WHEREIN THE MACHINE LEARNING MODEL IS CONFIGURED TO PREDICT, BASED ON THE ACOUSTIC DATA, THAT THE ENGINE IS GENERATING AN ANOMALOUS ACOUSTIC SIGNATURE — 216 — 206

FIG. 7

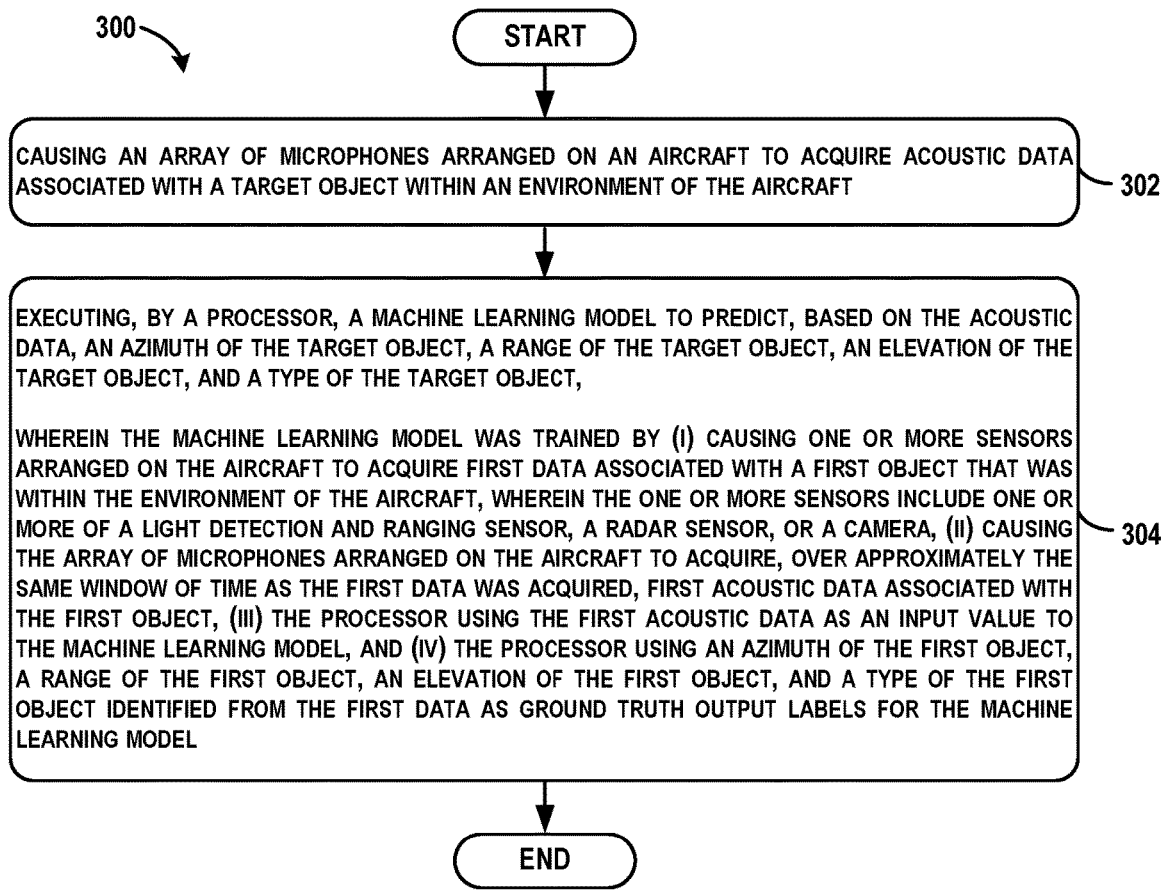

METHODS AND SYSTEMS FOR ACOUSTIC MACHINE PERCEPTION FOR AN AIRCRAFT

CROSS REFERENCE TO RELATED APPLICATION

The present disclosure is a continuation of U.S. patent application Ser. No. 16/440,636, filed on Jun. 13, 2019, the entire contents of which are herein incorporated by reference.

FIELD

The present disclosure relates generally to a machine perception system for a vehicle, and more particularly, to an acoustic-based machine perception system for an aircraft.

BACKGROUND

Perception systems can be employed in vehicles such as automobiles and aircrafts in order to facilitate various vehicle operations. For example, a perception system might acquire an image or a series of images of a vehicle's surrounding environment and attempt to recognize a presence of objects (e.g., automobiles, aircrafts, people, or other obstacles) in the image(s). Additionally, the perception system might determine the location of such objects and/or other information associated with such objects. From there, the perception system and/or related computing systems of the vehicle might cause the vehicle to perform an action related to a detected object, such as notifying a driver or passenger of the vehicle of the object's presence or adjusting a heading of the vehicle to follow or avoid the object. In other examples, the perception system might detect other information about the vehicle's surrounding environment as well, such as road markings and weather.

Existing perception systems, including those located onboard the vehicle or remote from the vehicle, often use modalities such as light detection and ranging (LIDAR), radar, and/or object recognition in camera images. However, these modalities can be expensive to implement and might not be robust in all environmental conditions. For example, severe weather conditions might obfuscate camera images or make it difficult to reconstruct LIDAR point cloud data, thus lowering the confidence with which the perception system detects objects and determines object information. In addition, such confidence can be further reduced if one or more radar sensors, one or more LIDAR sensors, and/or one or more cameras stop functioning.

What is needed is a perception system that reduces reliance on existing modalities and increases the confidence with which perception systems can detect objects and object information.

SUMMARY

In an example, a method is described. The method comprises causing one or more sensors arranged on an aircraft to acquire, over a window of time, first data associated with a first object that is within an environment of the aircraft, where the one or more sensors include one or more of a light detection and ranging sensor, a radar sensor, or a camera. The method further comprises causing an array of microphones arranged on the aircraft to acquire, over approximately the same window of time as the first data is acquired, first acoustic data associated with the first object, and training, by a processor, a machine learning model by using the first acoustic data as an input value to the machine learning model and by using an azimuth of the first object, a range of the first object, and a type of the first object identified from the first data as ground truth output labels for the machine learning model, wherein the machine learning model is configured to predict, based on target acoustic data subsequently acquired by the array of microphones and associated with a target object within the environment of the aircraft, an azimuth of the target object, a range of the target object, and a type of the target object.

In another example, a method is described. The method comprises causing an array of microphones arranged on an aircraft to acquire target acoustic data associated with a target object within an environment of the aircraft and executing, by a processor, a machine learning model to predict, based on the target acoustic data, an azimuth of the target object, a range of the target object, and a type of the target object, where the machine learning model was trained by (i) causing one or more sensors arranged on the aircraft to acquire first data associated with a first object that was within the environment of the aircraft, where the one or more sensors include one or more of a light detection and ranging sensor, a radar sensor, or a camera, (ii) causing the array of microphones arranged on the aircraft to acquire, over approximately the same window of time as the first data was acquired, first acoustic data associated with the first object, (iii) the processor using the first acoustic data as an input value to the machine learning model, and (iv) the processor using an azimuth of the first object, a range of the first object, and a type of the first object identified from the first data as ground truth output labels for the machine learning model.

In another example, a system comprising an aircraft, one or more sensors arranged on the aircraft, an array of microphones arranged on the aircraft, and a computing device is described. The one or more sensors include one or more of a light detection and ranging sensor, a radar sensor, or a camera. The computing device has a processor and memory storing instructions executable by the processor to perform a set of operations comprising causing the one or more sensors to acquire, over a window of time, first data associated with a first object that is within an environment of the aircraft, causing the array of microphones to acquire, over approximately the same window of time as the first data is acquired, first acoustic data associated with the first object, and training a machine learning model by using the first acoustic data as an input value to the machine learning model and by using an azimuth of the first object, a range of the first object, and a type of the first object identified from the first data as ground truth output labels for the machine learning model, wherein the machine learning model is configured to predict, based on target acoustic data subsequently acquired by the array of microphones and associated with a target object within the environment of the aircraft, an azimuth of the target object, a range of the target object, and a type of the target object.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 6 shows a flowchart of an example method for use with the method of FIG. 4, as well as a flowchart of an example method for performing the training function of the method of FIG. 4, according to an example implementation.

FIG. 7 shows a flowchart of another example method for use with the method of FIG. 4, as well as a flowchart of another example method for performing the training function of the method of FIG. 4, according to an example implementation.

FIG. 10 shows a flowchart of an example method for using the machine learning model of the system of FIG. 1 to predict information associated with the target object of FIG. 1, according to an example implementation.

FIG. 11 shows a flowchart of an example method for use with the method of FIG. 10, according to an example implementation.

FIG. 12 shows a flowchart of an example method for performing the causing function of the method of FIG. 10, according to an example implementation.

DETAILED DESCRIPTION

Figure 1:
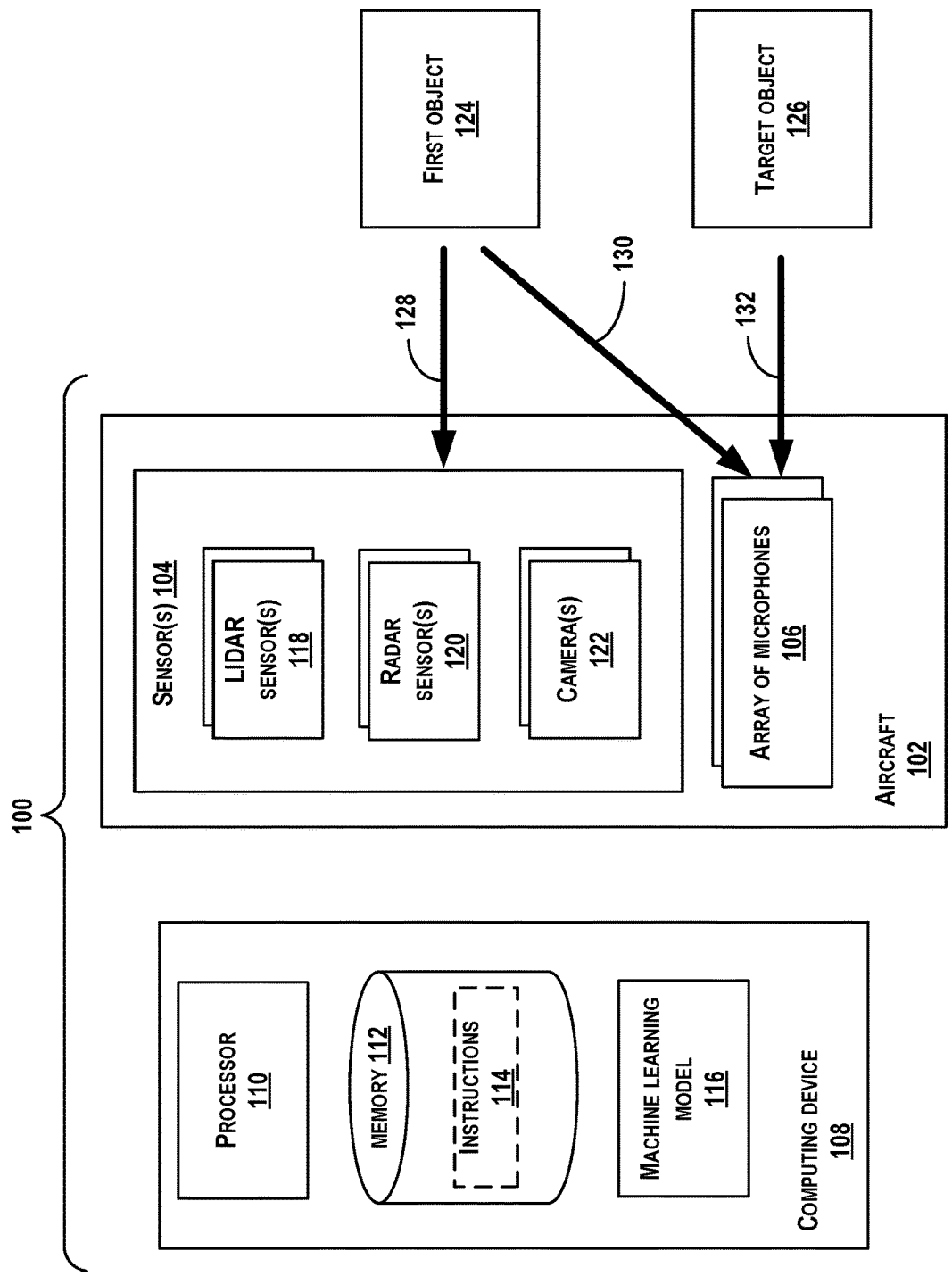
FIG. 1 is a block diagram of a system and objects in an environment of an aircraft of the system, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Within examples, described herein are methods and systems for training and using a machine learning model, particularly a machine learning model of an acoustic machine perception system. In this disclosure, examples are described primarily with respect to an aircraft. However, it should be understood that, in other implementations, the disclosed methods and systems can be implemented with vehicles other than an aircraft, such as an automobile.

The disclosed methods and systems involve an acoustic machine perception system for an aircraft, hereinafter referred to as the "system" for the sake of brevity. The system supports both audio and visual modalities. In particular, the system includes one or more sensors—namely, one or more LIDAR sensors, one or more radar sensors, and/or one or more cameras—that are arranged (e.g., mounted) on the aircraft and are used to obtain data (hereinafter referred to as "first data") associated with an object (hereinafter referred to as a "first object") that is within an environment of the aircraft, such as another aircraft. The first data can identify an azimuth of the first object, a range of the first object, an elevation of the first object, and a type of the first object, among other possible object information. The system also includes an array of microphones that are arranged (e.g., mounted) on the aircraft and are used to obtain acoustic data (hereinafter referred to as "first acoustic data") associated with the first object.

Together, a processor of the system uses the first data and the first acoustic data as supervisory training data for a machine learning model, so that the machine learning model can thereafter use acoustic data from a target object (hereinafter referred to as "target acoustic data") to predict object information associated with the target object, such as an azimuth, range, elevation, and type of the target object, among other possibilities. More particularly, the first acoustic data is used as an input value for training the machine learning model and the azimuth, range, elevation, type, etc. of the first object are used as ground truth output labels for training the machine learning model. Thus, during operation of the aircraft (e.g., while the aircraft is on the ground at an airport or in the air), the system can periodically or continuously use the sensors and array of microphones on the aircraft to acquire, in real-time, data related to various objects encountered in the environment of the aircraft, including relative 3DOF (three degrees of freedom) position of such objects. Further, the system can autonomously determine supervisory training data and use the supervisory training data to train the machine learning model—namely, for training the machine learning model in the first place and/or for updating/refining the machine learning model thereafter.

The disclosed system, as arranged and trained in the manner described above, can advantageously replace or supplement the existing perception systems that are rooted in modalities such as LIDAR, radar, and cameras. Further, the system's ability to autonomously determine supervisory training data, particularly ground truth, can improve efficiency in training perception systems. For example, some existing perception systems that involve machine learning can involve or require manual (i.e., by a human) or otherwise more labor-intensive and time-consuming processes for training models and acquiring ground truth output labels. But the disclosed system can reduce or eliminate the need for human intervention in training, and thereafter using, a machine learning model to detect objects and learn information about such objects in the environment. Moreover, where some existing perception systems might use multiple machine learning models for object recognition, the disclosed system can use only a single machine learning model.

As will be described in more detail elsewhere herein, the disclosed system can, in some examples, use additional information as ground truth output labels, such as data indicating weather conditions of the environment and/or states of the aircraft's engine. The additional information can be used to train the machine learning model to predict weather conditions and/or states of the aircraft's engine. Furthermore, additionally or alternatively to the system using the object information gleaned from the first data acquired via the sensors of the aircraft, the system can use object information broadcast from other objects within the aircraft's environment. For example, in a scenario where the first object is another aircraft, the first object might be configured to broadcast its azimuth, range, elevation, type, heading, speed, and/or other information that the system can use as additional ground truth output labels.

Unless otherwise noted, spatial information such as the azimuth, range, and elevation of a particular object that is estimated or determined using the one or more sensors of the aircraft or using the machine learning model can take the form of an azimuth, range, and elevation of the particular object relative to the aircraft whose LIDAR sensor(s), radar sensor(s), and/or camera(s) are being used to acquire the data for training the machine learning model. In the context of information broadcast by a particular object, the broadcasted azimuth, range, and elevation of the particular object can be an azimuth, range, and elevation relative to the Earth. Furthermore, the azimuth, range, elevation, and/or other spatial information predicted for a target object using the machine learning model can be spatial information relative to the aircraft in some implementations or relative to the Earth in other implementations. Other frames of reference are possible as well.

These and other improvements are described in more detail below. Implementations described below are for purposes of example. The implementations described below, as well as other implementations, may provide other improvements as well.

Referring now to the figures, FIG. 1 is an example of a system 100 for use in acoustic machine perception. The system 100 includes an aircraft 102, one or more sensors 104 arranged on the aircraft 102, an array of microphones 106 arranged on the aircraft 102, and a computing device 108 having a processor 110 and memory 112 storing instructions 114 executable by the processor 110 to perform operations related to training and using a machine learning model 116. As shown, the computing device 108 includes the machine learning model 116. The one or more sensors 104 includes one or more LIDAR sensors 118, one or more radar sensors 120, and one or more cameras 122.

As further shown, FIG. 1 depicts an example of a first object 124 that represents an object within an environment of the aircraft 102 and from which the system 100 can acquire information for use in training the machine learning model 116. FIG. 1 also depicts an example of a target object 126, which represents another object within the environment of the aircraft 102.

The aircraft 102 can take the form of various types of manned or unmanned aircraft, such as a commercial aircraft, a helicopter, or a drone, among other possibilities.

From the one or more sensors 104, a LIDAR sensor of the one or more LIDAR sensors 118 can take the form of an instrument that is configured to measure a distance to an object by firing pulses of laser light at a surface of the object and measuring the reflected pulses. The computing device 108 or another computing device can then use differences in laser return times and wavelengths to image the object, such as by creating a three-dimensional (3D) representation (e.g., a model) of the object.

Further, a radar sensor of the one or more radar sensors 120 can take the form of an instrument that includes (i) a transmitter (e.g., an electronic device having an antenna) for producing and transmitting electromagnetic waves (e.g., radio waves) and (ii) a receiver (e.g., an electronic device having an antenna, possibly the same antenna as the transmitter) for receiving the electromagnetic waves that are reflected off an object. In some examples, a particular radar sensor, or group of radar sensors, of the one or more radar sensors 120 can include its own processor, different from the processor 110 of the computing device 108, configured to determine properties of detected objects (e.g., a location, speed, range, angle, etc. of an object) based on the reflected electromagnetic waves. In alternative examples, the processor 110 of the computing device 108 can be configured to determine the properties of detected objects.

Still further, a camera of the one or more cameras 122 can take the form of an optical instrument configured to capture still images and/or record video of an environment of the aircraft 102, including objects in the environment.

The array of microphones 106 can be configured to convert sound into electrical signals and can include one or more sets of microphones arranged on the aircraft 102. Each such set of microphones can include one or more microphones. The array of microphones 106 can be located at one or more locations on the aircraft 102, such as a wing, wingtip, tail, tail tip, nose, and/or a surface of a body (e.g., a fuselage) of the aircraft 102 (e.g., mounted above and/or below the belly of the fuselage). The array of microphones 106 can be spatially distributed in a way that can maximize the temporal differential of audio captured in parallel across the array of microphones. Further, at least two microphones of the array of microphones 106 can be mounted to the aircraft 102 such that regardless of where the first object 124 (or the target object 126) is, the at least two microphones can have a direct line of sight to the object. In some scenarios, it might be advantageous to have at least a portion of the array of microphones 106 located farther away from where the engine of the aircraft 102 is located, so as not to have the sound of the engine drown out other important sounds in the environment.

The computing device 108 can take the form of a client device (e.g., a computing device that is actively operated by a user), a server, or some other type of computational platform. In some examples, the computing device 108 can be located onboard the aircraft 102, such as part of a navigational system of the aircraft 102. In alternative examples, the computing device 108 can be located remotely from the aircraft 102, such as part of a ground control station or a satellite. Other examples are possible as well.

The processor 110 can be a general-purpose processor or special purpose processor (e.g., a digital signal processor, application specific integrated circuit, etc.). As noted above, the processor 110 can be configured to execute the instructions 114 (e.g., computer-readable program instructions including computer executable code) that are stored in the memory 112 and are executable to provide various operations described herein. In alternative examples, the computing device 108 can include additional processors that are configured in the same manner.

The memory 112 can take the form of one or more computer-readable storage media that can be read or accessed by the processor 110. The computer-readable storage media can include volatile and/or non-volatile storage components, such as optical, magnetic, organic or other memory or disc storage, which can be integrated in whole or in part with the processor 110. The memory 112 is considered non-transitory computer readable media. In some examples, the memory 112 can be implemented using a single physical device (e.g., one optical, magnetic, organic or other memory or disc storage unit), while in other examples, the memory 112 can be implemented using two or more physical devices.

The machine learning model 116 can take the form of an artificial intelligence-based computational model that is executable by the processor 110 (or other processor), built using machine learning algorithms, and trained to make predictions or decisions without being explicitly programmed to do so. For example, the machine learning model 116 can be a neural network in which a number of elementary units (also referred to as "nodes") can work individually and in parallel and without central control to make predictions or decisions, or otherwise solve complex problems. Each node in a neural network can represent a mathematical function that receives one or more inputs and produces an output.

As noted above, the machine learning model 116 can be trained using some form of supervisory training data. Generally, the supervisory training data can include, for example, sets of input values and ground truth output values (referred to herein as "ground truth output labels"), where each set of one or more input values has a corresponding set of one or more desired ground truth output labels. That is, the ground truth output labels represent output values that are known to be accurate classifications of the corresponding input values or otherwise desired to be associated with the input values, and thus desired to be produced by the machine learning model 116 when the input values are provided.

In some examples, the machine learning model 116 can be trained by applying the input values and producing output values, after which the produced output values can be compared to the ground truth output labels. Particularly, a loss function (e.g., mean squared error or another metric) can be used to evaluate the error between the produced output values and the ground truth output labels and adjust the machine learning model 116 to reduce the error. This process can be performed iteratively until the error falls below a desired threshold. Other examples processes of training the machine learning model 116 are possible as well and can be used additionally or alternatively to those described herein.

The first object 124 can take the form of another aircraft, a human, another type of vehicle (e.g., ground support vehicles at an airport), or air traffic control device, among other possibilities. The target object 126 can take one of the forms listed above or can take another form.

In operation, a process for training the machine learning model 116 can involve causing the one or more sensors 104 to acquire, over a window of time (e.g., thirty seconds), first data 128 associated with the first object 124. The act of causing the one or more sensors 104 to acquire the first data 128 can involve causing one or more LIDAR sensors, one or more radar sensors, and/or one or more cameras to acquire the first data 128. As such, the first data 128 can include, by way of example, LIDAR data, radar data, a camera image, and/or a series of camera images.

Additionally, the process can involve causing the array of microphones 106 to acquire, over approximately the same window of time as the first data 128 is acquired, first acoustic data 130 associated with the first object 124. The first acoustic data 130 and the first data 128 can be acquired over approximately the same window of time so that the first acoustic data 130 can more accurately represent the sound that is present in the environment when the first object 124 is within the environment and be better correlated to the first data 128. The first acoustic data 130 can take the form of audio signals representative of the sound caused by the first object 124 and/or audio present in the environment during the window of time.

The one or more sensors 104 can be caused to acquire the first data 128 in various ways, such as by receiving an instruction from the computing device 108 or from another computing device. The computing device 108 or other computing device can be configured to transmit such an instruction automatically at predetermined times and/or can transmit such an instruction in response to receiving a manual input from a user. Other examples are possible as well. The first acoustic data 130 can be obtained in the same manner or a different manner.

From the first data 128, the computing device 108 (e.g., the processor 110), another computing device, and/or a human operator can identify various information associated with the first object 124, including, but not limited to: an azimuth of the first object 124, a range of the first object 124, an elevation of the first object 124, and a type of the first object 124. The term "type," as used in this context, can refer to information that identifies a detected object with varying granularity, such as (i) whether the object is a moving object or not moving, (ii) whether the object is an aircraft, automobile, human, ground support vehicle, etc., (iii) what type of aircraft (e.g., helicopter, commercial airliner, etc.), automobile (e.g., car, fuel truck, luggage cart, etc.), human (e.g., marshaller, pilot, etc.), etc. is present, and/or (iv) a model number or other identifier associated with the aircraft, automobile, etc. In some scenarios, the first object 124 (or the target object 126) can be the ground, in which case the type might identify the first object 124 (or the target object 126) as the ground. Other examples are possible as well.

In some implementations, the process can also involve the processor 110 or other computing device performing pre-processing to convert the first data 128 and/or the first acoustic data 130 into a form that is best suited for training the machine learning model 116. For example, the audio signals of the first acoustic data 130 can be converted into spectrograms that visually represent the frequencies of the audio signals over the window of time.

The processor 110 can then train the machine learning model 116 by using the first acoustic data 130 as an input value (or input values) to the machine learning model 116 and by using the azimuth, the range, the elevation, and the type of the first object 124 identified from the first data 128 as ground truth output labels for the machine learning model 116. That is, the processor 110 or other device can be configured to estimate, from the first data 128, values for the azimuth, range, elevation, and type of the first object 124 and input those values as ground truth into the machine learning model 116.

The training process can involve other operations as well. For example, the waveforms of the first acoustic data 130 can be time aligned (e.g., using coordinated universal time) to within milliseconds of a particular time stamp. The processor 110 or other device can then determine (e.g., using Kalman filtering or another technique) the azimuth, range, and elevation of the first object 124 that corresponds to the particular time stamp. Additionally, the first acoustic data 130 (e.g., the time-aligned waveforms) can be loaded into an indexed data chunk and the ground truth output labels (i.e., the estimated azimuth, range, elevation, etc. of the first object 124) can be loaded into a corresponding indexed data chunk, thus relating the first acoustic data 130 to the ground truth output labels. These and/or other operations described herein can be performed for any number of audio, LIDAR, camera, radar, etc. samples, such as thousands of samples, as part of the training process.

By training the machine learning model 116 in this manner, the machine learning model 116 can thus be configured to predict, based on target acoustic data 132 subsequently acquired (i.e., acquired at a point in time after the machine learning model 116 has been trained using the first acoustic data 130 and the ground truth output labels) by the array of microphones 106 and associated with the target object 126 within the environment of the aircraft 102, an azimuth of the target object 126, a range of the target object 126, an elevation of the target object 126, and a type of the target object 126, among other possible information. For example, the array of microphones 106 can acquire audio signals associated with the target object 126, convert the audio signals into spectrograms, and use the spectrograms as input values into the machine learning model 116 to cause the machine learning model 116 to generate, as output values, the azimuth, range, elevation, and type of the target object 126 (or estimates of what is believed to be the azimuth, range, elevation, and type of the target object 126).

Once trained to a desirable degree (e.g., the machine learning model 116 can identify at least a majority of objects with a confidence level that exceeds a predefined threshold), the machine learning model 116 can be deployed for use in the aircraft 102 and perhaps in other aircrafts as well. For example, the machine learning model 116 can help the aircraft 102 navigate with respect to target objects. As a more particular example, the system 100 or other computing system of the aircraft 102 might use the azimuth, range, elevation, or type of the target object 126 predicted using the machine learning model 116 to control the aircraft 102 to move and avoid the target object 126, such as if the target object 126 is another aircraft on a runway. As another example, such information can be used to control the aircraft 102 to adjust its heading to match a heading of the target object 126. As yet another example, the machine learning model 116 might be used to help the aircraft 102 determine the presence of the ground (i.e., where the ground is the target object 126) as the aircraft 102 is landing and/or the proximity of the ground relative to the aircraft 102, since sounds may change as the aircraft 102 approaches the ground. Other examples are possible as well.

Figure 2:
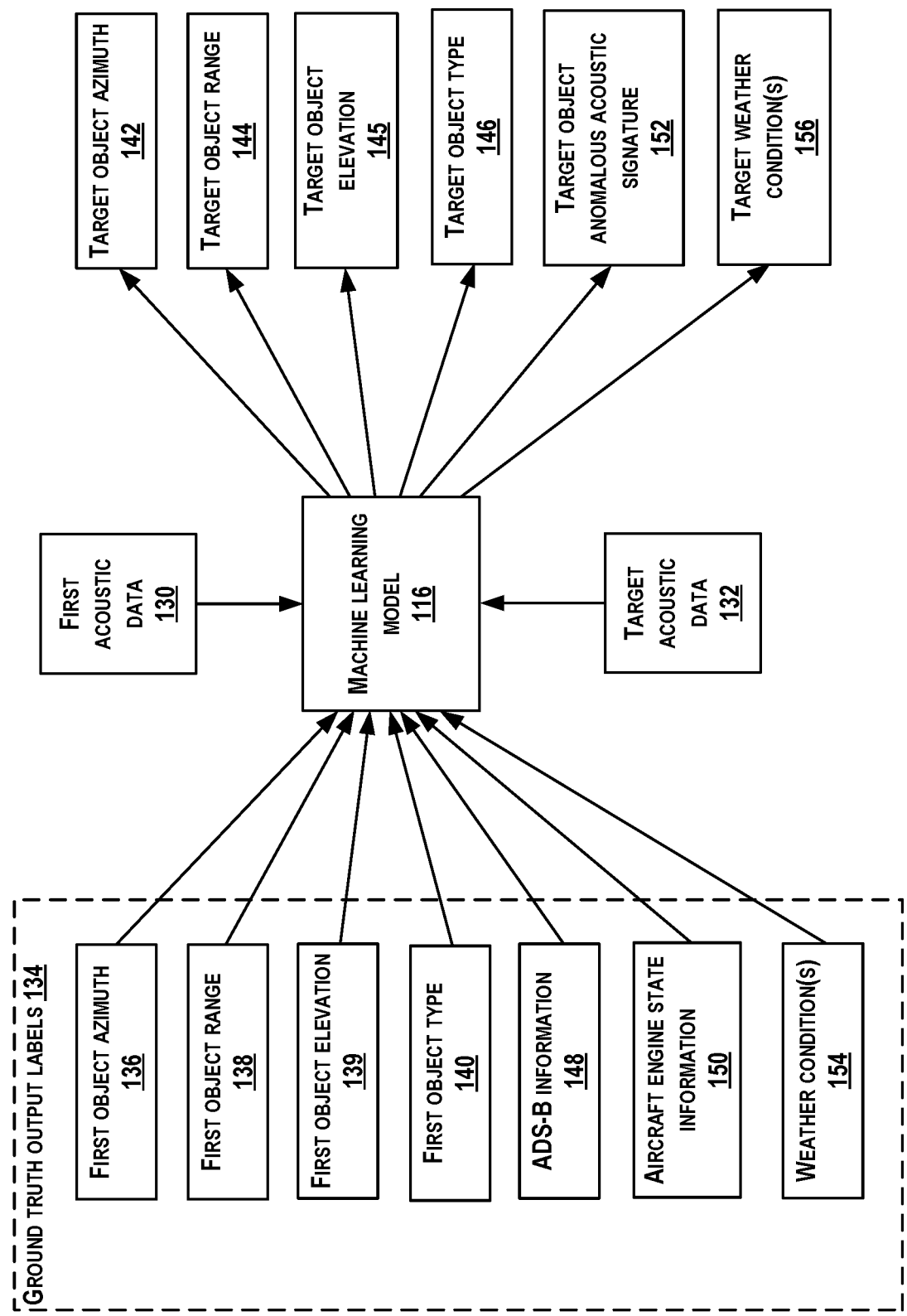
FIG. 2 is a diagram depicting data involved in an example process for training the machine learning model of the system of FIG. 1 and using the machine learning model to predict information associated with the target object of FIG. 1, according to an example implementation.

FIG. 2 is a diagram depicting data involved in an example process for training the machine learning model 116 and using the machine learning model 116 to predict information associated with the target object 126. As shown, for example, the machine learning model 116 is trained using the first acoustic data 130 and also using various information as ground truth output labels 134, including an azimuth, range, elevation, and type of the first object 124 (labeled in FIG. 2 as First Object Azimuth 136, First Object Range 138, First Object Elevation 139, and First Object Type 140, respectively). Once trained as such, the machine learning model 116 can predict an azimuth, range, and type of the target object 126 (labeled in FIG. 2 as Target Object Azimuth 142, Target Object Range 144, Target Object Elevation 145, and Target Object Type 146, respectively).

These operations enable the machine learning model 116 to be automatically trained during operation of the aircraft 102 (e.g., when the aircraft 102 is in motion in the air or on a runway, or when the aircraft 102 has its engine and systems running but is not moving) without having to manually label ground truth or create training scenarios for the system 100. In other words, the system 100 can desirably reduce or eliminate human intervention in the training process. Further, as noted above, the machine learning model 116, once trained, can advantageously be used to supplement existing LIDAR, radar, and camera perception systems and identify objects with increased confidence. Additionally or alternatively, a well-trained version of the machine learning model 116 can enable the aircraft 102 to identify objects based on sound alone, thus enabling the system 100 to replace existing LIDAR, radar, and camera perception systems or be used in the event that such LIDAR, radar, and camera perception systems are offline or otherwise unavailable.

In some implementations, other information can be used as the ground truth output labels 134, additionally or alternatively to the azimuth, range, elevation, and type of the first object 124 identified from the first acoustic data 130. For example, the processor 110 can detect, over approximately the same window of time as the first data 128 and the first acoustic data 130 are acquired, automatic dependent surveillance-broadcast (ADS-B) information 148 broadcast by the first object 124. To facilitate this, the first object 124 might include a general-purpose transponder and associated computing system configured to obtain various information about the first object 124, such as an azimuth, range, elevation, type, heading, speed, and/or a global positioning system (GPS) location of the first object 124, one or more of which can be indicated by the ADS-B information 148. The transponder might then broadcast, in real-time, the ADS-B information 148, which an antenna or other device either local to or remote from the system 100 can receive and transmit to the processor 110. The processor 110 can then use the azimuth, range, elevation, type, heading, speed, and/or GPS location of the first object 124 indicated by the ADS-B information 148 as at least a portion of the ground truth output labels 134 used to train the machine learning model 116. As discussed above, the spatial information, such as the azimuth, range, and elevation, that is broadcast as part of the ADS-B information 148 can be spatial information relative to the Earth, whereas the first object azimuth 136, first object range 138, and the first object elevation 139 can be spatial information relative to the aircraft 102.

In some scenarios, the ADS-B information 148 can be more accurate than information gleaned from LIDAR, radar, and/or camera data, in which case it can be helpful to use the ADS-B information 148 in addition to the first data 128 (e.g., to account for any discrepancy between the two) or alternatively to the first data 128. The ADS-B information 148 is an additional form of ground truth that the system 100 can obtain in real-time during operation of the aircraft 102, since various objects in the environment of the aircraft 102 at airports, in the air, etc. might be configured to broadcast such information. However, the ADS-B information 148 might not be available in some scenarios, such as when the first object 124 is a type of object that is not configured to broadcast such information.

Another example of ground truth for training the machine learning model 116 is a state of an engine of the aircraft 102. To facilitate this, the processor 110 can receive, over approximately the same window of time as the first data 128 and the first acoustic data 130 are acquired, information indicating the state of the engine of the aircraft 102 (labeled in FIG. 2 as Aircraft Engine State Information 150). For example, an avionics system of the aircraft 102 can be configured to provide various types of information, any one or more of which can make up the aircraft engine state information 150, such as values relating to a revolutions per minute (RPM) gauge associated with the engine, engine oil pressure, and/or engine fuel levels. Other examples are possible as well.

Upon receiving the aircraft engine state information 150, the processor 110 can then use the aircraft engine state information 150 as one of the ground truth output labels 134 used to train the machine learning model 116. Thus, the machine learning model 116 can be configured to use the target acoustic data 132 to predict whether the engine of the aircraft 102 is generating a normal acoustic signature (e.g., the engine is operating as expected) or is generating an anomalous acoustic signature (e.g., the engine is sputtering, louder than expected, and/or slowly turning off). For instance, the machine learning model 116 might output data indicating that the engine is generating an anomalous acoustic signature (labeled in FIG. 2 as Target Object Anomalous Acoustic Signature 152).

As so configured, the system 100 can quickly and accurately determine the engine state, corroborate another indication of the engine state, and/or recognize abnormalities with the engine state. For example, the target acoustic data 132 might indicate that the engine does not sound as expected, such as when the acoustic signature of the engine identified from the target acoustic data 132 does not match (or resemble within a threshold degree of confidence) any known acoustic signatures of the engine identified from previously-acquired acoustic data. In such a scenario, the machine learning model 116 can output data indicating that there is an issue with the engine.

The system 100 might use engine state in other ways as well. For example, in addition to being trained to recognize and make predictions about the engine of the aircraft 102 itself, the machine learning model 116 can be trained to recognize the acoustic signature of other types of engines used in other aircrafts or vehicles. Thus, the machine learning model 116 can be used to help the system 100 detect, or verify the identity and presence of, other aircrafts or vehicles based on the recognized acoustic signatures of the respective engines of the aircrafts or vehicles (e.g., acoustic signatures indicating that a nearby vehicle has the same engine or a similar engine as the aircraft 102). As another example, because the aircraft engine state information 150 can be used to help the system 100 recognize the sound that the engine of the aircraft 102 makes during normal operation, the system 100 or another computing system can perform preprocessing on the acoustic data to filter out the sound of the engine before acoustic data is used to predict information about a target object. This can be helpful in situations where the engine might be loud and might make it harder to detect nuances in the sounds produced by target objects. Other examples are possible as well.

In some situations, weather conditions, such as rain, snow, wind, and fog, can negatively impact LIDAR, radar, and/or camera data, and thus can lower the confidence with which a machine perception system identifies objects using such modalities. Thus, one or more weather conditions (labeled in FIG. 2 as Weather Condition(s) 154) can be used as one or more of the ground truth output labels 134 to train the machine learning model 116, additionally or alternatively to the other types of ground truth discussed above, thereby using acoustic perception to increase the confidence with which the system 100 identifies objects. This can serve as a practical and automated way of accounting for varying weather conditions that might be present in the environment of the aircraft 102.

The weather condition(s) 154 can be determined in various ways. As an example, the weather condition(s) 154 can be estimated and identified from the first data 128. For instance, the system 100 or another system of the aircraft 102 might be configured to identify the presence of rain or snow in a camera image or video.

Additionally or alternatively, the weather condition(s) 154 can be determined by correlating a weather report to a GPS location of the aircraft 102. To facilitate this, the processor 110 or other computing device of the aircraft 102 can determine, over approximately the same window of time as the first data 128 and the first acoustic data 130 are acquired, a GPS location of the aircraft 102. In addition, the processor 110 or other computing device can receive a weather report that indicates the weather condition(s) 154 in at least one geographic location, such as a county, city, or a region of a state or country. As such, the processor 110 or other computing device can determine that the weather condition(s) 154 indicated in the weather report are present at or near the GPS location of the aircraft 102—namely, at or where the aircraft 102 is or was during approximately the same window of time as the first data 128 and the first acoustic data 130 are/were acquired.

With the machine learning model 116 trained using the weather condition(s) 154, the machine learning model 116 can be configured to predict, based on the target acoustic data 132, that the weather condition(s) 154 are present in the environment of the aircraft 102. The predicted presence of the weather condition(s) 154 is labeled in FIG. 2 as Target Weather Condition(s) 156.

In some implementations, the array of microphones 106 that acquires the first acoustic data 130 (or, likewise, the target acoustic data 132) can include one or more microphones arranged on each wing of the aircraft 102, on or proximate to the wingtips. Within additional examples, one or more microphones can be arranged at the front of the aircraft 102, such as at the nose, and/or on a tail of the aircraft 102. Such microphones can be located at the tail, wingtips, etc. to avoid the sound of the engine of the aircraft 102 interfering with sounds from the first object 124. Having the microphones spaced out in this way can also be helpful to account for various locations of the first object 124 with respect to the aircraft 102. For example, if the first object 124 is behind the aircraft 102, the system 100 might be able to obtain better first acoustic data 130 using one or more microphones on the tail of the aircraft 102 than if no microphones were present on the tail. Other examples are possible as well.

Figure 3:
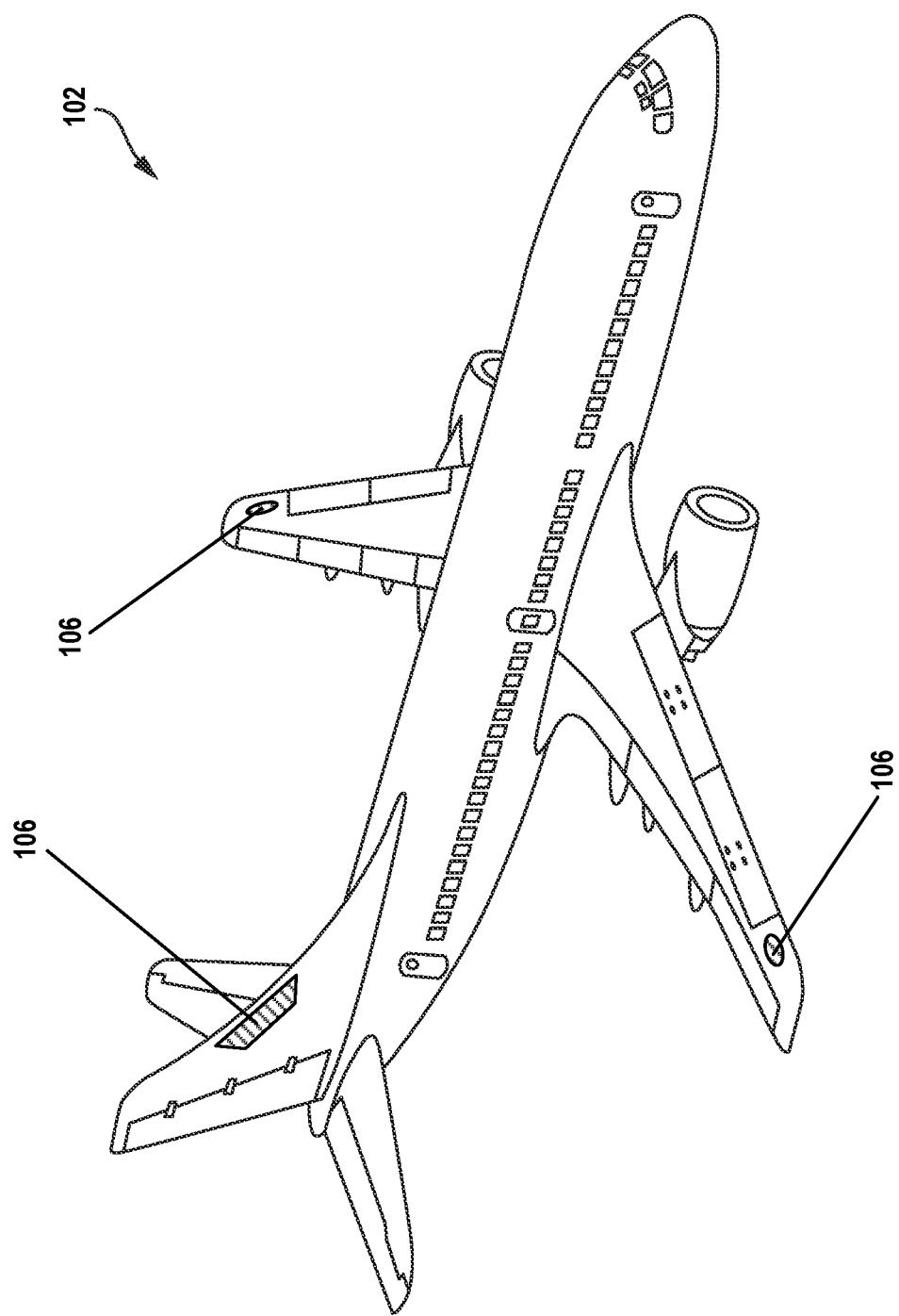
FIG. 3 is a perspective view of an aircraft, according to an example implementation.

As an illustrative example of where the array of microphones 106 can be located, FIG. 3 shows a perspective view of the aircraft 102. In particular, FIG. 3 shows that a respective set of microphones can be located on each wing of the aircraft 102 (e.g., proximate to the wingtips) and on the tail of the aircraft 102. (Because each set of microphones is part of the array of microphones 106, each set of microphones is designated in FIG. 3 with reference number 106.) In alternative examples, the array of microphones 106 can be located elsewhere.

In some implementations, the machine learning model 116 can be a single model specialized (i.e., trained) for use with acoustic data acquired by each microphone of the array of microphones 106. In alternative examples, the machine learning model 116 can be one of a plurality of machine learning models, each specialized for use with acoustic data acquired by a respective location on the aircraft 102 at which a microphone or microphone(s) is/are arranged. For example, one model can be specialized for use for microphones on the wingtips of the aircraft 102, whereas another model can be specialized for use for microphones on the tail of the aircraft 102. Other examples are possible as well.

Figure 4:
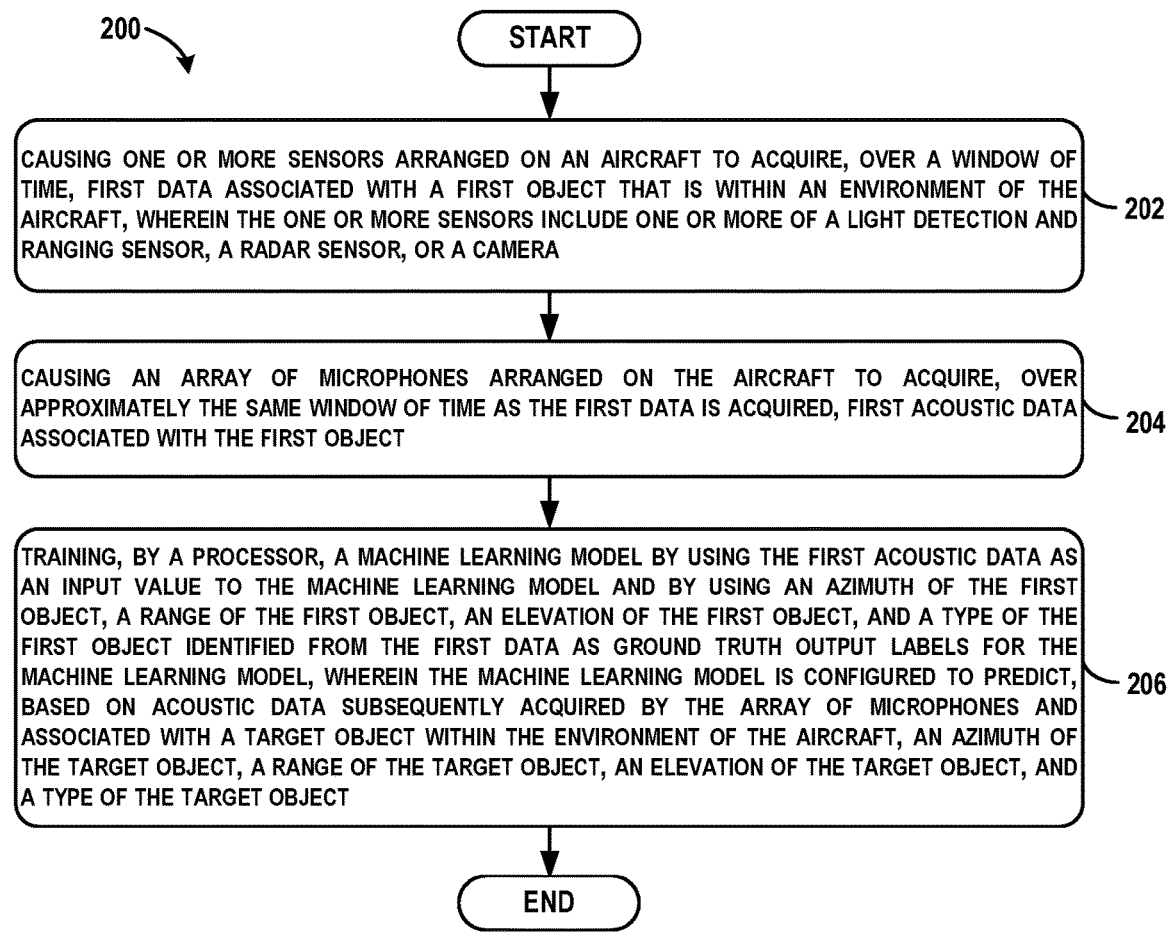
FIG. 4 shows a flowchart of an example method for training the machine learning model of the system of FIG. 1, according to an example implementation.

FIG. 4 shows a flowchart of an example of a method 200 that could be used with the system 100 shown in FIG. 1, particularly for training the machine learning model 116. Method 200 may include one or more operations, functions, or actions as illustrated by one or more of blocks 202-206.

At block 202, the method 200 includes causing one or more sensors arranged on an aircraft to acquire, over a window of time, first data associated with a first object that is within an environment of the aircraft, where the one or more sensors include one or more of a LIDAR sensor, a radar sensor, or a camera.

At block 204, the method 200 includes causing an array of microphones arranged on the aircraft to acquire, over approximately the same window of time as the first data is acquired, first acoustic data associated with the first object.

At block 206, the method 200 includes training, by a processor, a machine learning model by using the first acoustic data as an input value to the machine learning model and by using an azimuth of the first object, a range of the first object, an elevation of the first object, and a type of the first object identified from the first data as ground truth output labels for the machine learning model, wherein the machine learning model is configured to predict, based on target acoustic data subsequently acquired by the array of microphones and associated with a target object within the environment of the aircraft, an azimuth of the target object, a range of the target object, an elevation of the target object, and a type of the target object.

Figure 5:
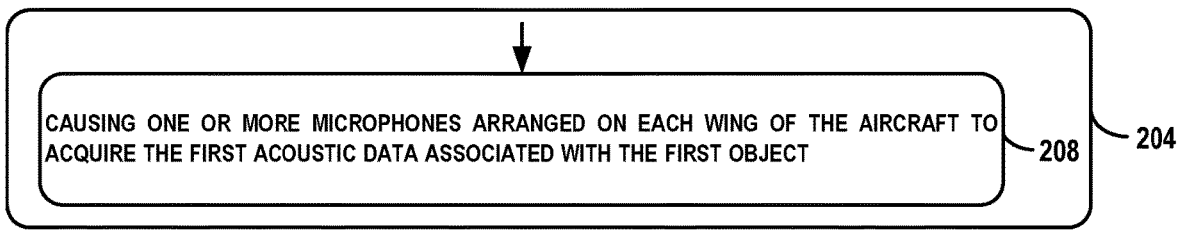
FIG. 5 shows a flowchart of an example method for performing one of the causing functions of the method of FIG. 4, according to an example implementation.

FIG. 5 shows a flowchart of an example method for performing the causing as shown in block 204. At block 208, functions include causing one or more microphones arranged on each wing of the aircraft to acquire the first acoustic data associated with the first object.

In some implementations, the azimuth of the first object, the range of the first object, and the elevation of the first object identified from the first data can be relative to the aircraft. In such embodiments, additional spatial information associated with the first object can be obtained and used as additional ground truth. FIG. 6 shows a flowchart of an example method for use with the method 200. At block 210, functions include detecting, by the processor, over approximately the same window of time as the first data and the first acoustic data are acquired, ADS-B information broadcast by the first object. The ADS-B information can indicate an azimuth of the first object relative to the Earth, a range of the first object relative to the Earth, an elevation of the first object relative to the Earth, the type of the first object, a heading of the first object, and a speed of the first object, among other possible information. FIG. 6 also shows a flowchart of an example method for performing the training as shown in block 206, particularly in an implementation where the processor detects the ADS-B information as shown in block 210. At block 212, functions include training the machine learning model by using the azimuth of the first object relative to the Earth, the range of the first object relative to the Earth, the elevation of the first object relative to the Earth, the type of the first object, the heading of the first object, and the speed of the first object indicated by the ADS-B information broadcast by the first object as at least a portion of the ground truth output labels for the machine learning model.

FIG. 7 shows a flowchart of another example method for use with the method 200. At block 214, functions include receiving, by the processor, over approximately the same window of time as the first data and the first acoustic data are acquired, information indicating a state of an engine of the aircraft. FIG. 7 also shows a flowchart of an example method for performing the training as shown in block 206, particularly in an implementation where the processor receives the information indicating the state of the engine as shown in block 214. At block 216, functions include training the machine learning model by using the state of the engine as one of the ground truth output labels for the machine learning model, wherein the machine learning model is configured to predict, based on the target acoustic data, that the engine is generating an anomalous acoustic signature.

Figure 8:
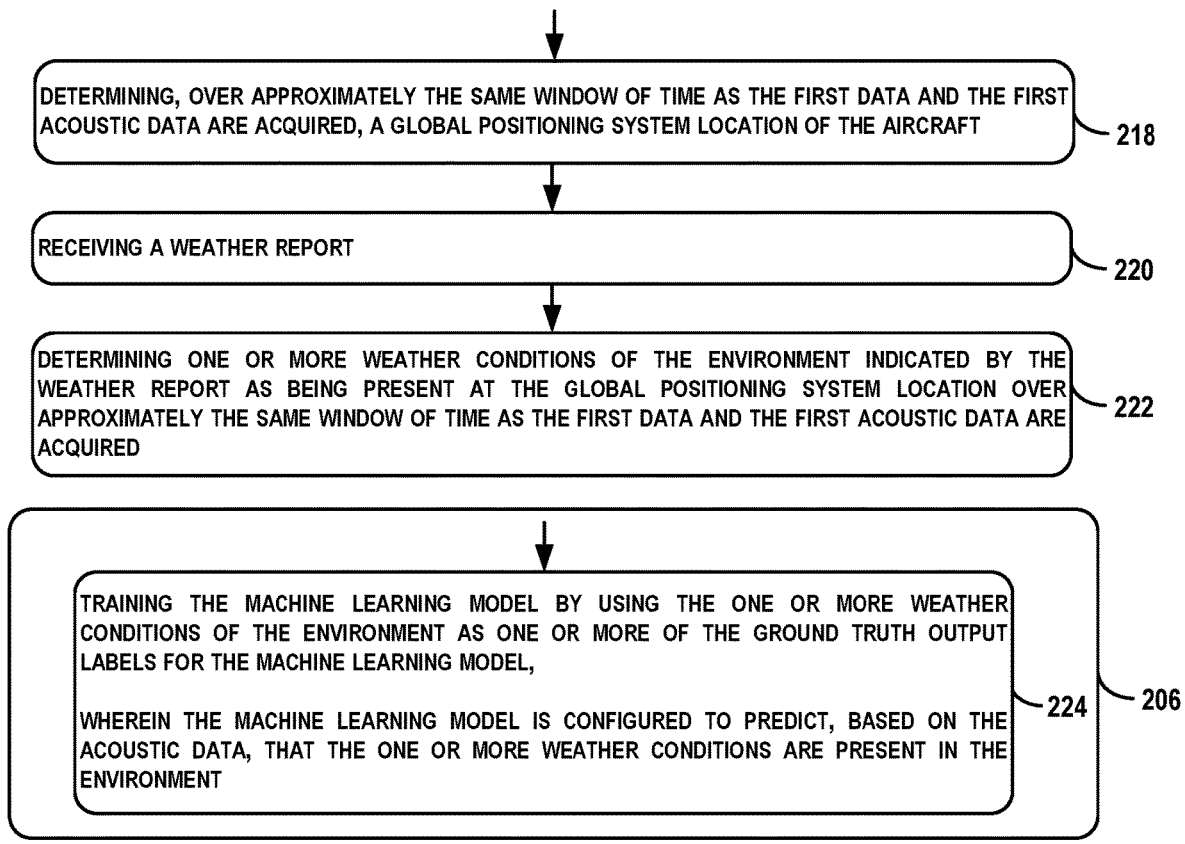
FIG. 8 shows a flowchart of another example method for use with the method of FIG. 4, as well as a flowchart of another example method for performing the training function of the method of FIG. 4, according to an example implementation.

FIG. 8 shows a flowchart of another example method for use with the method 200. At block 218, functions include determining, over approximately the same window of time as the first data and the first acoustic data are acquired, a GPS location of the aircraft. At block 220, functions include receiving a weather report. At block 222, functions include determining one or more weather conditions of the environment indicated by the weather report as being present at the GPS location over approximately the same window of time as the first data and the first acoustic data are acquired. FIG. 8 also shows a flowchart of an example method for performing the training as shown in block 206, particularly in an implementation where the functions of block 218, block 220, and block 222 are performed. At block 224, functions include training the machine learning model by using the one or more weather conditions of the environment as one or more of the ground truth output labels for the machine learning model, wherein the machine learning model is configured to predict, based on the target acoustic data, that the one or more weather conditions are present in the environment.

Figure 9:
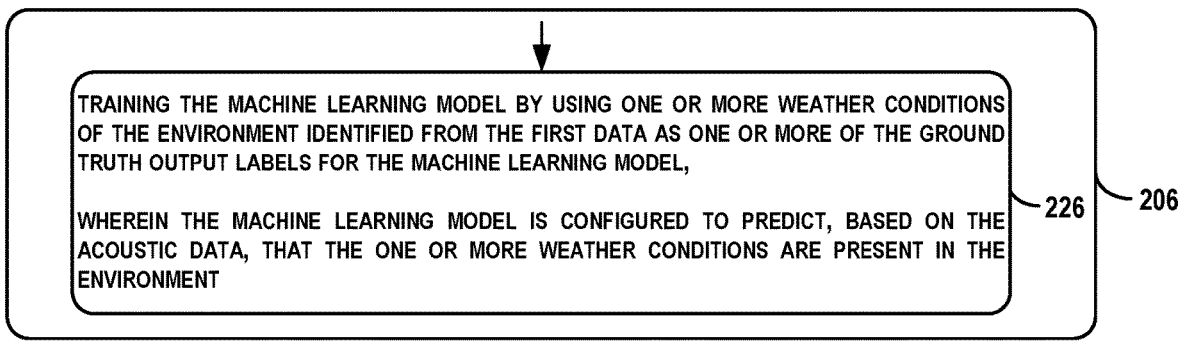
FIG. 9 shows a flowchart of another example method for performing the training function of the method of FIG. 4, according to an example implementation.

FIG. 9 shows a flowchart of another example method for performing the training as shown in block 206. At block 226, functions include training the machine learning model by using one or more weather conditions of the environment identified from the first data as one or more of the ground truth output labels for the machine learning model, wherein the machine learning model is configured to predict, based on the target acoustic data, that the one or more weather conditions are present in the environment.

FIG. 10 shows a flowchart of an example of a method 300 that could be used with the system 100 shown in FIG. 1, particularly for using the machine learning model 116 to predict information associated with a target object (e.g., target object 126) after the machine learning model 116 has been trained. Method 300 may include one or more operations, functions, or actions as illustrated by one or more of blocks 302-304.

At block 302, functions include causing an array of microphones arranged on an aircraft to acquire target acoustic data associated with a target object within an environment of the aircraft.

At block 304, functions include executing, by a processor, a machine learning model to predict, based on the target acoustic data, an azimuth of the target object, a range of the target object, an elevation of the target object, and a type of the target object, where the machine learning model was trained by (i) causing one or more sensors arranged on the aircraft to acquire first data associated with a first object that was within the environment of the aircraft, wherein the one or more sensors include one or more of a LIDAR sensor, a radar sensor, or a camera, (ii) causing the array of microphones arranged on the aircraft to acquire, over approximately the same window of time as the first data was acquired, first acoustic data associated with the first object, (iii) the processor using the first acoustic data as an input value to the machine learning model, and (iv) the processor using an azimuth of the first object, a range of the first object, an elevation of the first object, and a type of the first object identified from the first data as ground truth output labels for the machine learning model.

FIG. 11 shows a flowchart of an example method for use with the method 300. At block 306, functions include based on one or more of the azimuth of the target object, the range of the target object, the elevation of the target object, or the type of the target object, causing the aircraft to move and avoid the target object.

FIG. 12 shows a flowchart of an example method for performing the causing as shown in block 302. At block 308, functions include causing one or more microphones arranged on each wing of the aircraft to acquire the target acoustic data associated with the target object. The microphone(s) used to acquire the target acoustic data can be the same as or different from the microphone(s) used to acquire the first acoustic data.

Devices or systems may be used or configured to perform logical functions presented in FIGS. 4, 5, 6, 7, 8, 9, 10, 11, and 12. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Although blocks in FIGS. 4, 5, 6, 7, 8, 9, 10, 11, and 12, are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for these and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIGS. 4, 5, 6, 7, 8, 9, 10, 11, and 12 may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
causing one or more sensors arranged on an aircraft to acquire, over a window of time, first data associated with a first object that is within an environment of the aircraft while the aircraft is in motion, wherein the one or more sensors include one or more of a light detection and ranging sensor, a radar sensor, or a camera;
causing an array of microphones arranged on the aircraft to acquire, over approximately the same window of time as the first data is acquired, first acoustic data associated with the first object while the aircraft is in motion; and
training, by a processor, a machine learning model by using the first acoustic data as an input value to the machine learning model and by using one or more of an azimuth of the first object, a range of the first object, an elevation of the first object, or a type of the first object identified from the first data as ground truth output labels for the machine learning model,
wherein the machine learning model is configured to predict, based on target acoustic data subsequently acquired by the array of microphones and associated with a target object within the environment of the aircraft, one or more of an azimuth of the target object, a range of the target object, an elevation of the target object, or a type of the target object.

2. The method of claim 1, wherein causing the array of microphones arranged on the aircraft to acquire the first acoustic data associated with the first object comprises causing one or more microphones arranged on each wing of the aircraft to acquire the first acoustic data associated with the first object.

3. The method of claim 1, wherein the azimuth of the first object, the range of the first object, and the elevation of the first object identified from the first data are relative to the aircraft, the method further comprising:
  detecting, by the processor, over approximately the same window of time as the first data and the first acoustic data are acquired, automatic dependent surveillance-broadcast information broadcast by the first object,
  wherein the automatic dependent surveillance-broadcast information indicates one or more of an azimuth of the first object relative to the Earth, a range of the first object relative to the Earth, an elevation of the first object relative to the Earth, the type of the first object, a heading of the first object, or a speed of the first object, and
  wherein training the machine learning model comprises training the machine learning model by using one or more of the azimuth of the first object relative to the Earth, the range of the first object relative to the Earth, the elevation of the first object relative to the Earth, the type of the first object, the heading of the first object, or the speed of the first object indicated by the automatic dependent surveillance-broadcast information broadcast by the first object as at least a portion of the ground truth output labels for the machine learning model.

4. The method of claim 1, further comprising:
  receiving, by the processor, over approximately the same window of time as the first data and the first acoustic data are acquired, information indicating a state of an engine of the aircraft,
  wherein training the machine learning model comprises training the machine learning model by using the state of the engine as one of the ground truth output labels for the machine learning model,
  wherein the machine learning model is configured to predict, based on the target acoustic data, that the engine is generating an anomalous acoustic signature.

5. The method of claim 1, further comprising:
  determining, over approximately the same window of time as the first data and the first acoustic data are acquired, a global positioning system location of the aircraft;
  receiving a weather report; and
  determining one or more weather conditions of the environment indicated by the weather report as being present at the global positioning system location over approximately the same window of time as the first data and the first acoustic data are acquired,
  wherein training the machine learning model comprises training the machine learning model by using the one or more weather conditions of the environment as one or more of the ground truth output labels for the machine learning model,
  wherein the machine learning model is configured to predict, based on the target acoustic data, that the one or more weather conditions are present in the environment.

6. The method of claim 1, wherein training the machine learning model comprises training the machine learning model by using one or more weather conditions of the environment identified from the first data as one or more of the ground truth output labels for the machine learning model,
  wherein the machine learning model is configured to predict, based on the target acoustic data, that the one or more weather conditions are present in the environment.

7. The method of claim 1, wherein the processor is part of a computing device that is positioned remotely from the aircraft.

8. The method of claim 1, wherein the processor is part of a computing system located onboard the aircraft.

9. A method comprising:
  causing an array of microphones arranged on an aircraft to acquire target acoustic data associated with a target object within an environment of the aircraft while the aircraft is in motion; and
  executing, by a processor, a machine learning model to predict, based on the target acoustic data, one or more of an azimuth of the target object, a range of the target object, an elevation of the target object, or a type of the target object,
  wherein the machine learning model was trained by (i) causing one or more sensors arranged on the aircraft to acquire first data associated with a first object that was within the environment of the aircraft while the aircraft was in motion, wherein the one or more sensors include one or more of a light detection and ranging sensor, a radar sensor, or a camera, (ii) causing the array of microphones arranged on the aircraft to acquire, over approximately the same window of time as the first data was acquired, first acoustic data associated with the first object while the aircraft was in motion, (iii) the processor using the first acoustic data as an input value to the machine learning model, and (iv) the processor using one or more of an azimuth of the first object, a range of the first object, an elevation of the first object, or a type of the first object identified from the first data as ground truth output labels for the machine learning model.

10. The method of claim 9, further comprising:
  based on one or more of the azimuth of the target object, the range of the target object, the elevation of the target object, or the type of the target object, causing the aircraft to move and avoid the target object.

11. The method of claim 9, wherein causing the array of microphones arranged on the aircraft to acquire the target acoustic data associated with the target object comprises causing one or more microphones arranged on each wing of the aircraft to acquire the target acoustic data associated with the target object.

12. The method of claim 9, wherein the azimuth of the first object, the range of the first object, and the elevation of the first object identified from the first data are relative to the aircraft, and
  wherein the machine learning model was further trained by:
    detecting, by the processor, over approximately the same window of time as the first data and the first acoustic data were acquired, automatic dependent surveillance-broadcast information broadcast by the first object, wherein the automatic dependent surveillance-broadcast information indicates one or more of an azimuth of the first object relative to the Earth, a range of the first object relative to the Earth, an elevation of the first object relative to the Earth, the type of the first object, a heading of the first object, or a speed of the first object, and
    using one or more of the azimuth of the first object relative to the Earth, the range of the first object relative to the Earth, the elevation of the first object relative to the Earth, the type of the first object, the heading of the first object, or the speed of the first object indicated by the automatic dependent surveillance-broadcast information broadcast by the first object as at least a portion of the ground truth output labels for the machine learning model.

13. The method of claim 9, wherein the machine learning model was further trained by:
receiving, by the processor, over approximately the same window of time as the first data and the first acoustic data were acquired, information indicating a state of an engine of the aircraft, and
using the state of the engine as one of the ground truth output labels for the machine learning model,
wherein the machine learning model is configured to predict, based on the target acoustic data, that the engine is generating an anomalous acoustic signature.

14. The method of claim 9, wherein the machine learning model was further trained by:
determining, over approximately the same window of time as the first data and the first acoustic data were acquired, a global positioning system location of the aircraft,
receiving a weather report,
determining one or more weather conditions of the environment indicated by the weather report as being present at the global positioning system location over approximately the same window of time as the first data and the first acoustic data were acquired, and
using the one or more weather conditions of the environment as one or more of the ground truth output labels for the machine learning model,
wherein the machine learning model is configured to predict, based on the target acoustic data, that the one or more weather conditions are present in the environment.

15. The method of claim 9, wherein the machine learning model was further trained by using one or more weather conditions of the environment identified from the first data as one or more of the ground truth output labels for the machine learning model, wherein the machine learning model is configured to predict, based on the target acoustic data, that the one or more weather conditions are present in the environment.

16. A system comprising:
an aircraft;
one or more sensors arranged on the aircraft, wherein the one or more sensors include one or more of a light detection and ranging sensor, a radar sensor, or a camera;
an array of microphones arranged on the aircraft; and
a computing device having a processor and memory storing instructions executable by the processor to perform a set of operations comprising:
causing the one or more sensors to acquire, over a window of time, first data associated with a first object that is within an environment of the aircraft while the aircraft is in motion;
causing the array of microphones to acquire, over approximately the same window of time as the first data is acquired, first acoustic data associated with the first object while the aircraft is in motion; and
training a machine learning model by using the first acoustic data as an input value to the machine learning model and by using one or more of an azimuth of the first object, a range of the first object, an elevation of the first object, or a type of the first object identified from the first data as ground truth output labels for the machine learning model, wherein the machine learning model is configured to predict, based on target acoustic data subsequently acquired by the array of microphones and associated with a target object within the environment of the aircraft, one or more of an azimuth of the target object, a range of the target object, an elevation of the target object, or a type of the target object.

17. The system of claim 16, wherein the computing device is onboard the aircraft.

18. The system of claim 16, wherein the array of microphones comprises one or more microphones arranged on each wing of the aircraft.

19. The system of claim 16, wherein the one or more of the azimuth of the first object, the range of the first object, or the elevation of the first object identified from the first data are relative to the aircraft, the set of operations further comprising:
detecting, over approximately the same window of time as the first data and the first acoustic data are acquired, automatic dependent surveillance-broadcast information broadcast by the first object,
wherein the automatic dependent surveillance-broadcast information indicates one or more of an azimuth of the first object relative to the Earth, a range of the first object relative to the Earth, an elevation of the first object relative to the Earth, the type of the first object, a heading of the first object, or the speed of the first object, and
wherein training the machine learning model comprises training the machine learning model by using one or more of the azimuth of the first object relative to the Earth, the range of the first object relative to the Earth, the elevation of the first object relative to the Earth, the type of the first object, the heading of the first object, or the speed of the first object indicated by the automatic dependent surveillance-broadcast information broadcast by the first object as at least a portion of the ground truth output labels for the machine learning model.

20. The system of claim 16, the set of operations further comprising:
receiving, over approximately the same window of time as the first data and the first acoustic data are acquired, information indicating a state of an engine of the aircraft,
wherein training the machine learning model comprises training the machine learning model by using the state of the engine as one of the ground truth output labels for the machine learning model,
wherein the machine learning model is configured to predict, based on the target acoustic data, that the engine is generating an anomalous acoustic signature.

* * * * *